(12) United States Patent
Matsui

(10) Patent No.: US 8,683,860 B2
(45) Date of Patent: Apr. 1, 2014

(54) FLOW-GAIN BASED HYDRAULIC ACTUATOR LEAKAGE TEST

(75) Inventor: Gen Matsui, Bothell, WA (US)

(73) Assignee: The Boeing Company, Chicago, IL (US)

( * ) Notice: Subject to any disclaimer, the term of this patent is extended or adjusted under 35 U.S.C. 154(b) by 321 days.

(21) Appl. No.: 13/284,805

(22) Filed: Oct. 28, 2011

(65) Prior Publication Data

US 2013/0104991 A1    May 2, 2013

(51) Int. Cl.
*G01P 13/00* (2006.01)
*F17D 3/00* (2006.01)

(52) U.S. Cl.
USPC ............................................. 73/170.02; 137/1

(58) Field of Classification Search
None
See application file for complete search history.

(56) References Cited

U.S. PATENT DOCUMENTS

| | | | |
|---|---|---|---|
| 4,089,494 A | 5/1978 | Anderson et al. | |
| 5,615,593 A | 4/1997 | Anderson et al. | |
| 6,317,658 B1 | 11/2001 | Vian | |
| 7,283,933 B2 | 10/2007 | Roach et al. | |
| 7,283,934 B2 | 10/2007 | Deller et al. | |
| 7,292,954 B2 | 11/2007 | Deller et al. | |
| 7,347,083 B2 | 3/2008 | Beiderman et al. | |
| 7,567,862 B2 | 7/2009 | Pelton et al. | |
| 7,784,490 B1 * | 8/2010 | Stewart et al. | 137/556 |
| 7,970,583 B2 | 6/2011 | Novis et al. | |
| 8,245,967 B2 | 8/2012 | Kirkland | |
| 2007/0028674 A1 | 2/2007 | Beiderman et al. | |
| 2010/0050786 A1 * | 3/2010 | Kiesbauer et al. | 73/862.583 |
| 2010/0286959 A1 | 11/2010 | Novis et al. | |
| 2012/0283982 A1 | 11/2012 | Englund | |
| 2012/0303210 A1 | 11/2012 | Matsui | |
| 2013/0116834 A1 * | 5/2013 | Grabinger et al. | 700/276 |

FOREIGN PATENT DOCUMENTS

| | | |
|---|---|---|
| EP | 2075474 A2 | 10/2008 |
| WO | WO2006014997 A1 | 2/2006 |

OTHER PUBLICATIONS

GB Search Report, GB1218418-0, Feb. 6, 2013.

\* cited by examiner

*Primary Examiner* — Andre Allen
(74) *Attorney, Agent, or Firm* — Ameh IP; Elahe Toosi; Lowell Campbell

(57) ABSTRACT

A system and methods for non-optimal actuator detection are disclosed. A fluid valve controlling a fluid flow to a first actuator is activated, and the fluid valve is controlled to move the first actuator from an initial position to a first position and back to the initial position during a test interval. A measured valve position of the fluid valve is measured during the test interval, and a measured valve travel is calculated based on the measured valve position at an end of the test interval. A health status of the first actuator is determined based on the measured valve travel and an expected valve travel.

20 Claims, 7 Drawing Sheets

FLOW-GAIN BASED HYDRAULIC ACTUATOR LEAKAGE TEST

FIELD

Embodiments of the present disclosure relate generally to anomaly detection. More particularly, embodiments of the present disclosure relate to actuator anomaly detection.

BACKGROUND

Vehicle or aircraft structures are typically subject to a variety of expected and unexpected exogenous operational forces throughout their operational life. Operational health of such structures may be adversely affected by an anomalous structural response to the expected and unexpected exogenous operational forces. Operational forces such as changes in aerodynamic loading and unexpected forces such as wind gusts may result in non-optimal structural conditions. Flight control actuators, for example, may be tested for such non-optimal structural conditions prior to takeoff. Current testing methods may interfere with, for example, "everyday" operations of an airline, and may significantly increase an operating cost for the airline.

SUMMARY

A system and methods for non-optimal actuator detection are disclosed. A fluid valve controlling a fluid flow to a first actuator is activated, and the fluid valve is controlled to move the first actuator from an initial position to a first position and back to the initial position during a test interval. A measured valve position of the fluid valve is measured during the test interval, and a measured valve travel is calculated based on the measured valve position at an end of the test interval. A health status of the first actuator is determined based on the measured valve travel and an expected valve travel.

In this manner, embodiments provide an expedient, automated process transparent to operators, and robust for testing for leakage of, for example, flight control actuators on ground. The test can be repeated on a regular basis without interfering with, for example, "everyday" operations of an airline. Such a test may significantly decrease the operating cost (e.g., airline operating cost) and can lengthen a required interval between structural evaluations.

In an embodiment, a method for non-optimal actuator detection activates a fluid valve controlling a fluid flow to a first actuator, and controls the fluid valve to move the first actuator from an initial position to a first position and back to the initial position during a test interval. The method further measures a measured valve position of the fluid valve during the test interval, and calculates a measured valve travel based on the measured valve position at an end of the test interval. The method further determines a health status of the first actuator based on the measured valve travel and an expected valve travel.

In another embodiment, a non-optimal actuator detection system comprises a control module, a sensing module, and an evaluation module. The control module is operable to activate a fluid valve controlling a fluid flow to a first actuator, and control the fluid valve to move the first actuator from an initial position to a first position and back to the initial position during a test interval. The sensing module is operable to measure a measured valve position of the fluid valve during the test interval. The evaluation module is operable to calculate a measured valve travel based on the measured valve position at an end of the test interval, and determine a health status of the first actuator based on the measured valve travel and an expected valve travel.

In a further embodiment, a computer readable storage medium comprising computer-executable instructions for performing a method for actuator leakage detection. The method executed by the computer-executable instructions activates a fluid valve controlling a fluid flow to a first actuator, and controls the fluid valve to move the first actuator from an initial position to a first position and back to the initial position during a test interval. The method executed by the computer-executable instructions further measures a measured valve position of the fluid valve during the test interval, and calculates a measured valve travel based on the measured valve position at an end of the test interval. The method executed by the computer-executable instructions further determines a health status of the first actuator based on the measured valve travel and an expected valve travel.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to control laws, control systems, measurement techniques, measurement sensors, actuators, data transmission, signaling, network control, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, non-optimal actuator detection for an aircraft control surface. Embodiments of the disclosure, however, are not limited to such aircraft structure, and the techniques described herein may also be utilized in other applications. For example but without limitation, embodiments may be applicable to manned and unmanned ground, air, space, water and underwater vehicles, windmills, or other machinery.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
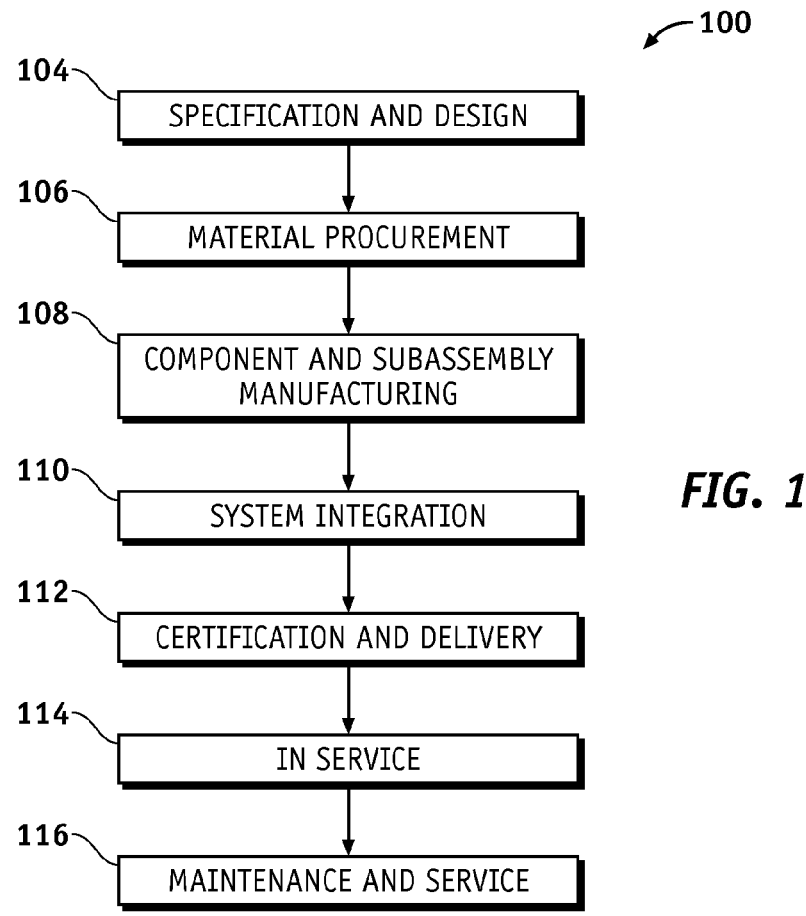
FIG. 1 is an illustration of a flow diagram of an exemplary aircraft production and service methodology.
Figure 2:
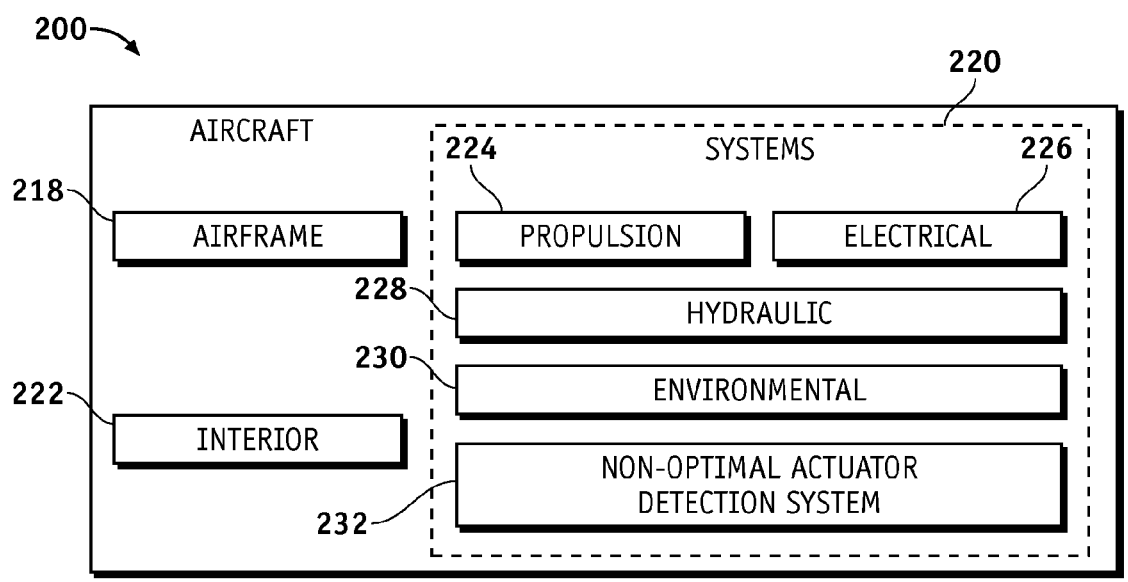
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing process 108 (production stage 108) and system integration 110 (production stage 110) of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization, and the like.

As shown in FIG. 2, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a non-optimal actuator detection system 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production stage 108 may be fabricated or manufactured in a manner similar to components or subassemblies produced while the aircraft 200 is in service. In addition, one or more apparatus embodiments, method embodiments, or a combination thereof may be utilized during production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Flight control surfaces are deflected by actuator(s) (hydraulically or electrically powered) to ultimately control a flight path. Such flight control surfaces may comprise, for example but without limitation, elevators for pitch control, ailerons and flaperons for roll control, rudder for yaw control, or other flight control surface. There are often multiple actuators attached to a single surface in parallel, and in many cases, they are all activated in normal conditions. There are control mechanisms (e.g., electronic, mechanical) that control the deflection to which each actuator positions the surface.

A hydraulic actuator can develop an internal leakage through wear and component anomaly. A large leakage may compromise the hydraulic actuator's ability to provide its intended functions. In routine operation, this may be latent because of low demand on the actuator. However, anomaly to generate the output per design during less frequently encountered high-demand operation condition may be non-optimal. In airplane flight controls application, such a situation may arise, for example, due to anomaly of an actuator on the same surface, loss of motive power, or emergency maneuvers, or other non-optimal operation condition.

It is desirable and often required, therefore, to test for leakage on a regular basis. However, a long cumbersome test may interfere with an "everyday" operation, particularly if the test needs to be run frequently (e.g., every flight cycle). Such a test may significantly increase the operating cost (e.g., airline operating cost) and may not be viable. Therefore, embodiments of the disclosure provide an expedient, automated process transparent to the operators, and robust ("false positive" would also interrupt operation) for testing for leakage on ground. Achieving these objectives are especially useful for cases where an opportunity for running a test is limited, such as a case for rudder actuators because of the high level of activities even on the ground for steering. This information can lengthen a required interval between on ground structural evaluations, and thus save cost.

Figure 3:
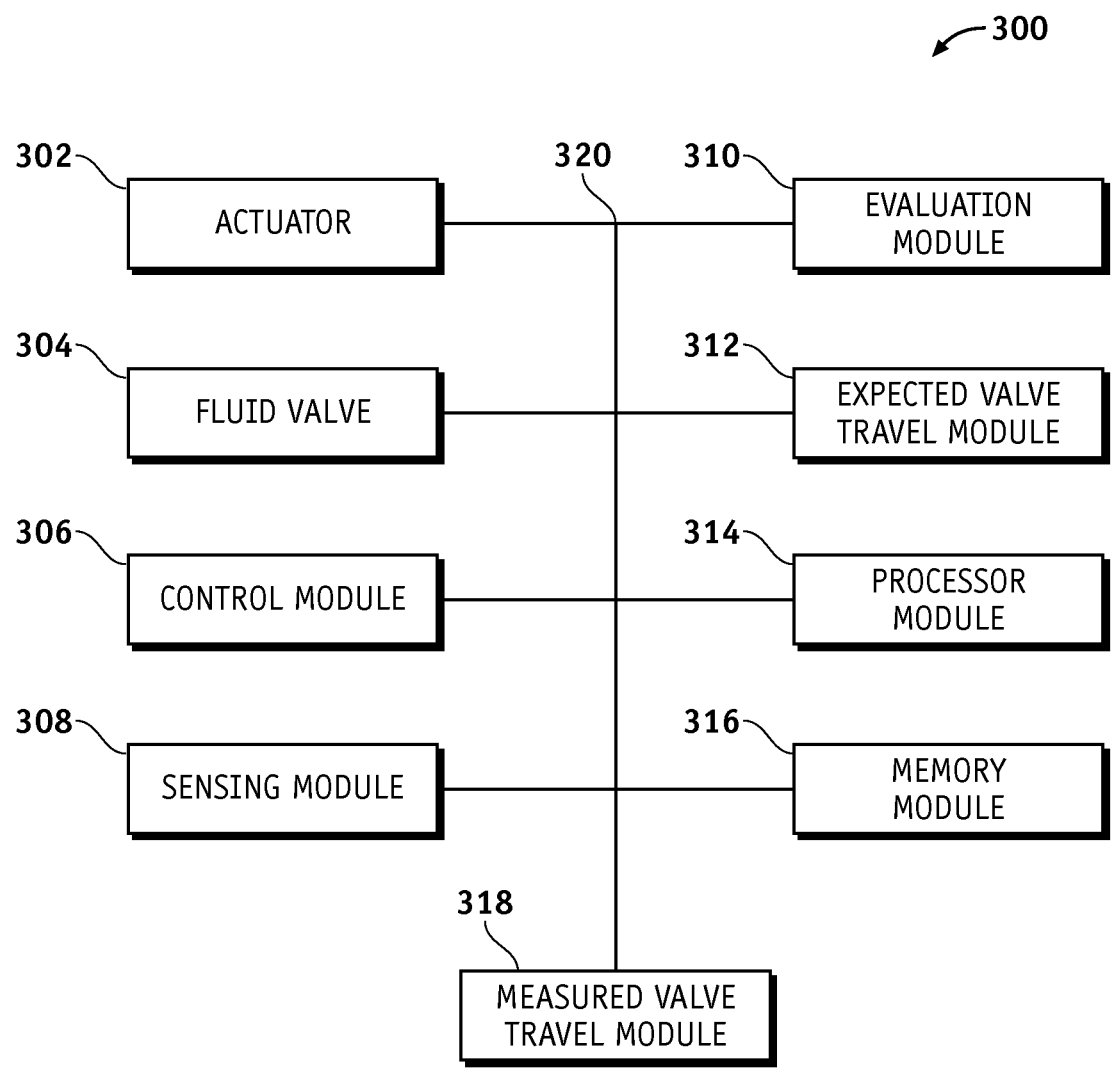
FIG. 3 is an illustration of an exemplary non-optimal actuator detection system according to an embodiment of the disclosure.

FIG. 3 is an illustration of an exemplary non-optimal actuator detection system 300 according to an embodiment of the disclosure. The various illustrative blocks, modules, processing logic, and circuits described in connection with system 300 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. While the system 300 is applicable to a wide range of subsystems and modules of a primary aircraft flight control system, an exemplary system 300 is schematically illustrated in FIG. 3. System 300 is described below in conjunction with FIGS. 4 and 5.

The system 300 comprises an actuator 302 (actuator-under-test 302), a fluid valve 304, a control module 306, a sensing module 308, an evaluation module 310, an expected valve travel module 312, a processor module 314, a memory module 316, and a measured valve travel module 318. In some embodiments, one or more modules may reside outside the process module 314, and may be coupled to other modules by a bus 320.

Figure 4:
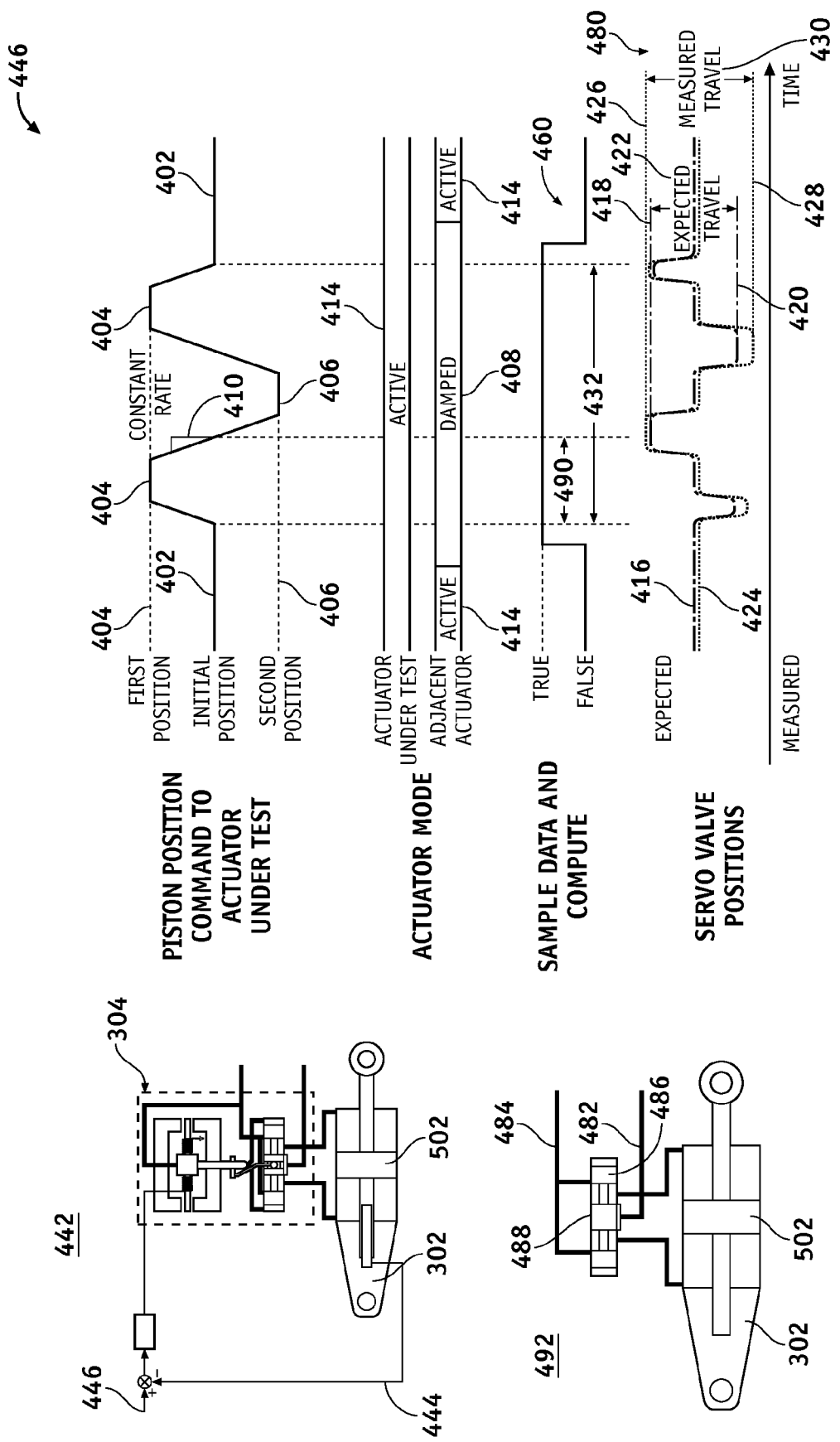
FIG. 4 is an illustration of an exemplary test sequence according to an embodiment of the disclosure.

The actuator 302 may comprise, for example but without limitation, a hydraulic actuator, a pneumatic actuator, or other suitable actuator. The actuator 302 may be coupled to a device such as, but without limitation, a flight control surface, an aerodynamic control surface, a fluid dynamic control surface, or other device that may be coupled to an actuator. The system 300 also comprises a second actuator 512 (FIG. 5) not under test and coupled to the device coupled to the actuator 302. The second actuator 512 operates in a damped mode 408 (FIG. 4).

Figure 5:
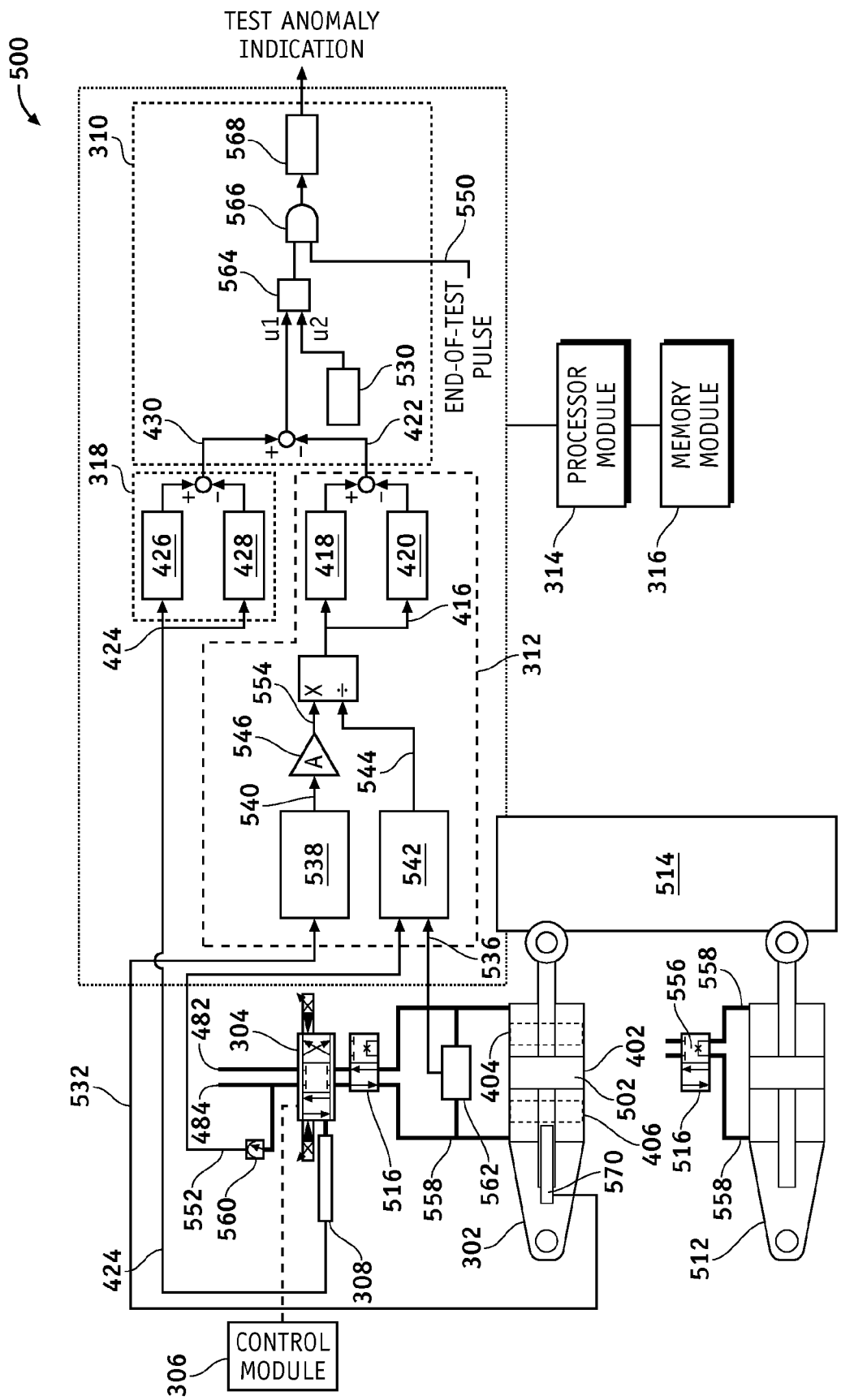
FIG. 5 is an illustration of an exemplary non-optimal actuator detection system showing the system of FIG. 3 in more detail according to an embodiment of the disclosure.

The fluid valve 304 may comprise, for example but without limitation, a servo valve, a solenoid valve, a ball valve, a butterfly valve, a diaphragm valve, or other suitable valve. The fluid valve 304 may be coupled to the actuator 302 directly, or through, for example but without limitation, a fluid supply line, a hydraulic supply line, a pneumatic supply line, or other suitable connector. For a given fluid supply line pressure 552 and differential pressure 536 (FIG. 5), a hydraulic fluid flow through the fluid valve 304 is proportional to its displacement, referred to as the "flow gain" of the fluid valve 304. In an absence of leakage, the flow through the fluid valve 304 should directly translate to a piston motion of the actuator piston 502 (FIG. 5). Therefore, there is a direct relationship between a piston velocity of the actuator piston 502 and the valve displacement of the fluid valve 304. The test conducted by the system 300 utilizes the fact that, leakage would alter the direct relationship and that larger valve displacement would be required to achieve a given piston velocity of the actuator piston 502.

The control module 306 is operable to activate the fluid valve 304 controlling a fluid flow to the actuator 302, and control the fluid valve 304 to move the actuator piston 502 of the actuator 302. The fluid valve 304 may be controlled by an electrohydraulic servo valve or any other valve control mechanism via a position loop 444 (FIG. 4). The fluid valve 304 is configured to receive the piston position command 446 (FIG. 4) from the processor module 314.

A fluid valve position (e.g., expected valve position 416 in FIG. 4) refers to a position of, for example, a valve spool 486. When the valve spool 486 is in a middle position 488, there is no flow in/out of the actuator 302 (i.e., fluid supply line/return lines 484/482 are decoupled from the lines connecting to the actuator 302). When the valve spool 486 moves to the left, the valve spool 486 connects the supply line 484 to a left chamber of the actuator 302 and the return line 482 to a right chamber of the actuator 302, so the actuator piston 502 extends (i.e., moves to the right). When the valve spool 486 moves to the right, the fluid supply line 484 connects to the right chamber and the return line 482 to the left chamber, so the actuator piston 502 retracts (i.e., moves to the left).

For example, regarding a position of the valve spool 486, assume the middle position 488 (neutral) to be a zero position, and positive (+) is to a right side of an assembly 492. Therefore, no actuator piston 502 movement is expected when the valve spool 486 is at the middle/zero position 488. If the actuator 302 is commanded via the fluid valve 304 to move the actuator piston 502 to a right side of assembly 492 at a constant rate (e.g., extend), the valve spool 486 displaces to a left side of assembly 492 (e.g., a negative position, and a furthest move is a "substantially minimum" position). If the actuator 302 is commanded via the fluid valve 304 to move the actuator piston 502 to a left side of the assembly 492 at a constant rate (e.g., retract), the valve spool 486 displaces to the right side of assembly 492 (e.g., a positive direction, and a furthest move is a "substantially maximum" position).

Valve travel is a difference between a substantially maximum and a substantially minimum regardless of whether the actuator piston 502 is moving in one direction (e.g., initial position 402 to first position 404) or moving in both directions (e.g., the initial position 402 to first position 404 to a second position 406).

As used herein, the terms maximum and minimum generally refer to a relative motion to a particular reference, and need not necessarily refer to a maximum and minimum possible operation of hardware.

The test sequence in FIG. 4 tests a piston position 532 (piston positional signal) from a piston position sensor 570 (e.g., a transducer in FIG. 5) in two directions. In this manner, the control module 306 controls the fluid valve 304 to move the actuator piston 502 from the initial position 402 to the first position 404, and to the second position 406 at a rate 410, back to the first position 404 at a same rate 410 (e.g., with positive slope), and back to the initial position 402 during a test interval 432. The measure valve travel module 318, measures a valve travel 430 at an end of the test interval 432.

Alternatively, a test sequence can be used to test the piston position 532 from the piston position sensor 570 in one direction. In this manner, the control module 306 controls the fluid valve 304 to move the actuator piston 502 from the initial position 402 to the first position 404, and back to the initial position 402. This one direction test sequence is faster than the two direction test sequence described above, however, it requires larger surface deflection of a control surface 514 (FIG. 5). In this manner, the control module 306 controls the fluid valve 304 to move the actuator piston 502 from the initial position 402 to the first position 404 with the rate 410, and back to the initial position 402 with the same rate 410 (e.g., negative slope) during a test interval 490. The measure valve travel module 318, measures the valve travel 430 at the end of the test interval 490.

When measuring the substantially maximum position and the substantially minimum position, any number of motions of the actuator piston 502 may be used to form a test sequence during a test interval. For example, the test sequence may comprise moving the actuator piston 502, without limitation, 1) form the initial position 402 to the first position 404, 2) form the initial position 402 to the first position 404 and back to the initial position 404 during the test interval 490 as shown in FIG. 4; 3) form the initial position 402 to the first position 404 and to the second position 406; 4) from the initial position 402 to the first position 404 to the second position 406 and back to the first position 404; 5) form the second position 406 to the first position 404; 6) from the initial position 402 to the first position 404 to the second position 406, back to the first position 404, and back to the initial position 402 during the test interval 432 as shown in FIG. 4, and any other motions and combinations thereof.

As shown in FIG. 5, the measured valve travel module 318 receives a measured valve position 424 of the fluid valve 304 from the sensing module 308 during the test interval 432/490. The measured valve travel module 318 captures a measured maximum valve position 426 and a measured minimum valve position 428 of the measured valve position 424 at the end of the test interval 432/490. The measured valve travel module 318 then computes a difference between the measured maximum valve position 426 and the measured minimum valve position 428 to provide the measured valve travel 430. If the measured valve travel 430 is increased compared to an expected valve travel 422 a leakage is indicated as explained below in the context of discussion of FIG. 5.

Measured maximum valve position 426 and a measured minimum valve position 428 may comprise, for example but without limitation, a forward flow setting, and a reverse flow setting, or other suitable setting. In this document, maximum and minimum mean substantially maximum and substantially minimum.

The sensing module 308 is operable to measure the measured valve position 424 of the fluid valve 304 during or at the end of the test interval 432/490.

The evaluation module 310 is operable to determine a health status of the actuator 302 based on the measured valve travel 430 and an expected valve travel 422. In this manner, the evaluation module 310 computes a valve travel difference (e.g., excess valve travel) between the measured valve travel 430 and the expected valve travel 422, and indicates a non-optimal actuator if the valve travel difference exceeds a threshold value 530 (FIG. 5).

The expected valve travel module 312 is operable to compute the expected valve travel 422 of the fluid valve 304 based on the fluid flow. In this manner, the expected valve travel module 312 receives a measurement of the fluid supply line pressure 552 (measured fluid supply line pressure) of the fluid supply line 484, coupled to the fluid valve 304 from a supply pressure sensor 560 (FIG. 5). The expected valve travel module 312 also receives a measurement of a differential pressure 536 (measured differential pressure) across the actuator piston 502 of the actuator 302 from a differential sensor 562 (FIG. 5), and computes a flow gain 544 based on the (measured) fluid supply line pressure 552 and the (measured) differential pressure 536. The expected valve travel module 312 also receives a measurement of the piston position 532 (measured piston position) of the actuator piston 502 from the piston position sensor 570, and computes a piston velocity 540 based on the (measured) piston position 532. The piston velocity 540 may also be computed based on the piston position command 446.

The expected valve travel module 312 then computes the expected valve position 416 based on the flow gain 544 and the piston velocity 540. The expected valve travel module 312 captures an expected maximum valve position 418 and an expected minimum valve position 420 of the expected valve position 416 during the test interval 432. Additionally, the expected valve travel module 312 then computes a difference between the expected maximum valve position 418 and the expected minimum valve position 420 to provide the expected valve travel 422.

The processor module 314 comprises processing logic that is configured to carry out the functions, techniques, and processing tasks associated with the operation of the system 300. In particular, the processing logic is configured to support the system 300 described herein. For example, the processor module 314 sends a signal comprising the piston position command 446 to the fluid valve 304.

A processor may be realized as a microprocessor, a controller, a microcontroller, a state machine, and the like. A processor may also be implemented as a combination of computing devices, e.g., a combination of a digital signal processor and a microprocessor, a plurality of microprocessors, one or more microprocessors in conjunction with a digital signal processor core, or any other such configuration.

The processor module 314 also accesses data stored in various databases in the memory module 316, to support functions of the system 300. The processor module 314 enables the system 300 to automatically test for a non-optimal actuator in the aircraft 200.

The processor module 314 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 316 may be a data storage area with memory formatted to support the operation of the system 300. The memory module 316 is configured to store, maintain, and provide data as needed to support the functionality of the system 300 in the manner described below. In practical embodiments, the memory module 316 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory module 316 may be coupled to the processor module 314 and configured to store the data mentioned above.

Additionally, the memory module 316 may represent a dynamically updating database containing a table for updating various databases. The memory module 316 may also store, data, a computer program that is executed by the processor module 314, an operating system, an application program, tentative data used in executing a program, and the like.

The memory module 316 may be coupled to the processor module 314 such that the processor module 314 can read information from and write information to the memory module 316. As an example, the processor module 314 and the memory module 316 may reside in respective application specific integrated circuits (ASICs). The memory module 316 may also be integrated into the processor module 314. In an embodiment, the memory module 316 may comprise a cache memory for storing temporary variables or other intermediate information during execution of instructions to be executed by the processor module 314.

FIG. 4 is an illustration of an exemplary test sequence according to an embodiment of the disclosure. FIG. 4 shows an example of an actuator piston position command mode and sampling time for an actuator-under-test 302 and an adjacent actuator 512 coupled to a control surface 514 (FIG. 5). The actuator-under-test 302 is commanded to extend and retract by a constant rate 410, but many other command profiles are also possible. A test can be designed such that a required stroke of the actuator piston 502 is small and a time required to complete this sequence may comprise, for example but without limitation, about a couple of seconds, or other suitable time interval. While a fixed command profile is described here, an alternative configuration is also possible where the deflection due to normal operation (e.g., rudder deflection accompanying steering) is used.

The valve position (e.g., the measured valve position 424) may generally have some bias, but by using the valve travel (as opposed to directly comparing positions), the test eliminates an effect of the bias on an outcome, and thereby contributes to robustness.

Flow is determined using an actual piston velocity (e.g., as opposed to a commanded velocity) of the actuator piston 502, to increase sensitivity of the test. This is because a leakage may have an effect of reducing the piston velocity 540, which would have an effect of reducing the expected valve travel 422 of the fluid valve 304. Concurrently, an actual valve travel of the fluid valve 304 would increase to try to keep up with a commanded rate. In other words, by using the actual piston velocity 540, leakage would cause a split by decreasing the expected valve travel 422 and increasing the measured valve travel 430.

FIG. 4 and FIG. 5 show the adjacent actuator 512 being put in a "damped" mode 408. In the "damped" mode 408, the adjacent actuator 512 provides some resistance to being back-driven by the actuator-under-test 302 in the "active" mode 414. Resistance causes the fluid valve 304 to displace in order to achieve a given piston velocity of the actuator piston 502. Therefore, a resistance from the adjacent actuator 512 (damped actuator) has an effect of expanding a difference between valve displacement with and without leakage, and thus, improving sensitivity. In other words, without any resistance, a required valve displacement may be so small to start with that discerning a difference caused by leakage may be difficult.

While in the embodiment shown in FIGS. 4 and 5 an actuator such as the adjacent actuator 512 attached in parallel with the actuator-under-test 302 is described as an example to provide this resistance, sufficient external resistance may be provided by some other means to cause sufficient valve displacement.

FIG. 5 is an illustration of an exemplary non-optimal actuator detection system showing the system of FIG. 3 in more detail according to an embodiment of the disclosure. The embodiment shown in FIG. 5 may have functions, material, and structures that are similar to the embodiments shown in FIG. 3. Therefore common features, functions, and elements may not be redundantly described here.

FIG. 5 shows the actuator under test 302 in the active mode 414 (FIG. 4). The actuator under test 302 in the active mode 414 may comprise, for example, a position of a mode select valve 516 providing a direct connection between actuator ports 558 on the actuator under test 302. The adjacent actuator 512 is in the damped mode 408 (FIG. 4), and this is shown by a position 556 of the mode select valve 516 which isolates actuator ports 558 from the fluid valve 304 and connects them through a restrictive orifice. As explained above, in the damped mode 408, the adjacent actuator 512 provides resistive force corresponding to a velocity that the adjacent actuator 512 is back driven by.

For a fluid supply line pressure 552 of the fluid supply line 484 and a differential pressure 536, a hydraulic fluid flow through the fluid valve 304 is proportional to a displacement of the fluid valve 304, referred to as a "flow gain" of the fluid valve 304. In an absence of leakage, a flow through the fluid valve 304 should directly translate to a piston motion of the actuator piston 502. Therefore, there is a direct relationship between a piston velocity of the actuator piston 502 and a valve displacement of the fluid valve 304. The test utilizes that a leakage would alter the direct relationship and that larger valve displacement would be required to achieve a given piston velocity of the actuator piston 502.

During the test, the actuator piston 502 may be commanded to stroke in both directions by a small displacement. The expected valve travel module 312 is turned on during the test, and the expected maximum valve position 418 and the expected minimum valve position 420 of the expected valve position 416 are captured as explained above. Concurrently, the measured maximum valve position 418 and the measured minimum valve position are also captured via the measured valve travel module 318.

A difference between the measured maximum valve position 426 and the measured minimum valve position 428 is the measured valve travel 430. Similarly, a difference between the expected maximum valve position 418 and the expected minimum valve position 420 is the expected valve travel 422. The expected valve travel 422 and the measured travel 430 are compared, and if the measured valve travel 430 exceeds the expected valve travel 422 by greater than the threshold value 530 (e.g., exceeding the threshold value indicates excessive leakage), the test declares an anomaly.

In operation, the (measured) piston position 532, the measured valve position 424, and the (measured) differential pressure 536 are received from respective sensors in the actuator under test 302. For example, the differential pressure 536 is measured by the differential sensor 562, and the measured valve position 424 is measured by the sensing module 308. The expected valve position 416 may be continuously computed during the test interval 432/490 by the expected valve travel module 312. In a compute piston velocity module 538, the piston velocity 540 is computed from a rate of change of the piston position 532. In a compute flow gain module 542, the flow gain 544 is computed based on the fluid supply line pressure 552 and the differential pressure 536, as well as the characteristics of the fluid valve 304, comprising a slot width and discharge coefficient.

The system 500 assumes that the return pressure is constant, but some accuracy improvement can be achieved also by additionally measuring and sampling the return pressure. While external influences can affect the pressures and cause changes in the (actual) flow gain 544, such effects are also reflected in the compute flow gain module 542 by sampling the supply pressure 522 measured by the supply pressure sensor 560, and the differential pressure 536 measured by the differential sensor 562. Thus, ensuring test robustness (e.g., avoids "false-positives" or "nuisance trips"). The piston velocity 540 is then multiplied by the area 546 of the actuator piston 502 to derive the fluid flow rate required to move the actuator piston 502 at a computed velocity 554 (useful flow 554). The computed velocity 554 is divided by the flow gain 544 to calculate the expected valve position 416.

The measured maximum valve position 426, the measured minimum valve position 428, the expected maximum valve position 418, and the expected minimum valve position 420 are continuously updated during the test interval 432/490.

The expected valve travel 422 and the measured valve travel 430 are computed as explained above.

An amount by which the measured valve travel 430 exceeds the expected valve travel 422 is indicative of an existing leakage, and this difference (U1) is compared in a comparator 564 against the threshold value 530 (U2) at the end of the test interval 432/490. An AND gate 566 receives a "logical one value" from an end-of-test pulse 550. The AND gate 566 also receives a "logical one value" or a "logical zero value" from the comparator 564 depending on a comparison result (U1–U2). For example, if the threshold value 530 is exceeded (U1>U2), the AND gate 566 receives a "logical one value" from the comparator 564. In this case, the AND gate 566 outputs a "logical one value" to a latch 568 at the end of the test. A test anomaly indication is then made by the latch 568 so that appropriate maintenance action can be taken. The threshold value 530 can be set based on how much leakage can be tolerated.

Figure 6:
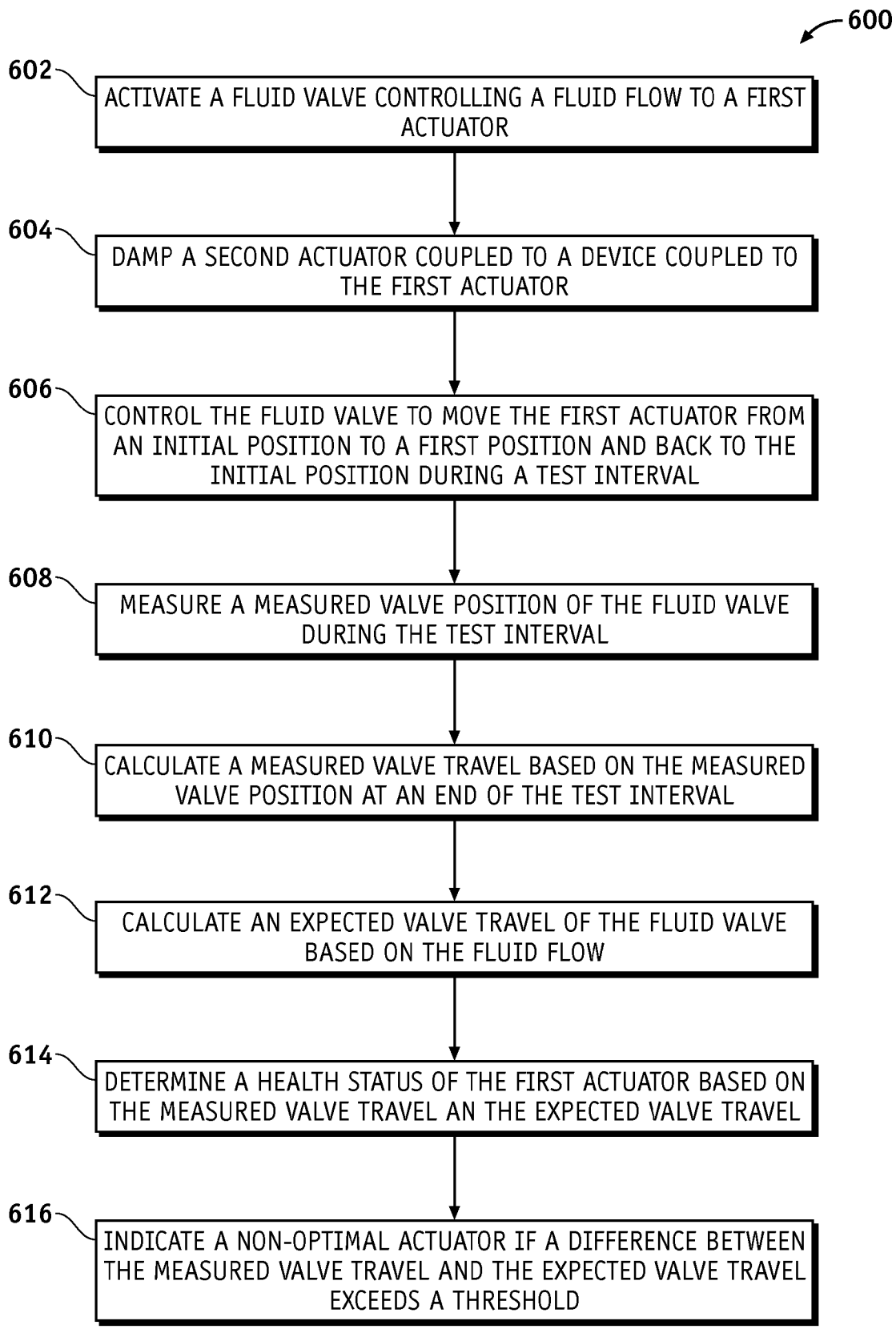
FIG. 6 is an illustration of an exemplary flowchart showing a non-optimal actuator detection process according to an embodiment of the disclosure.
Figure 7:
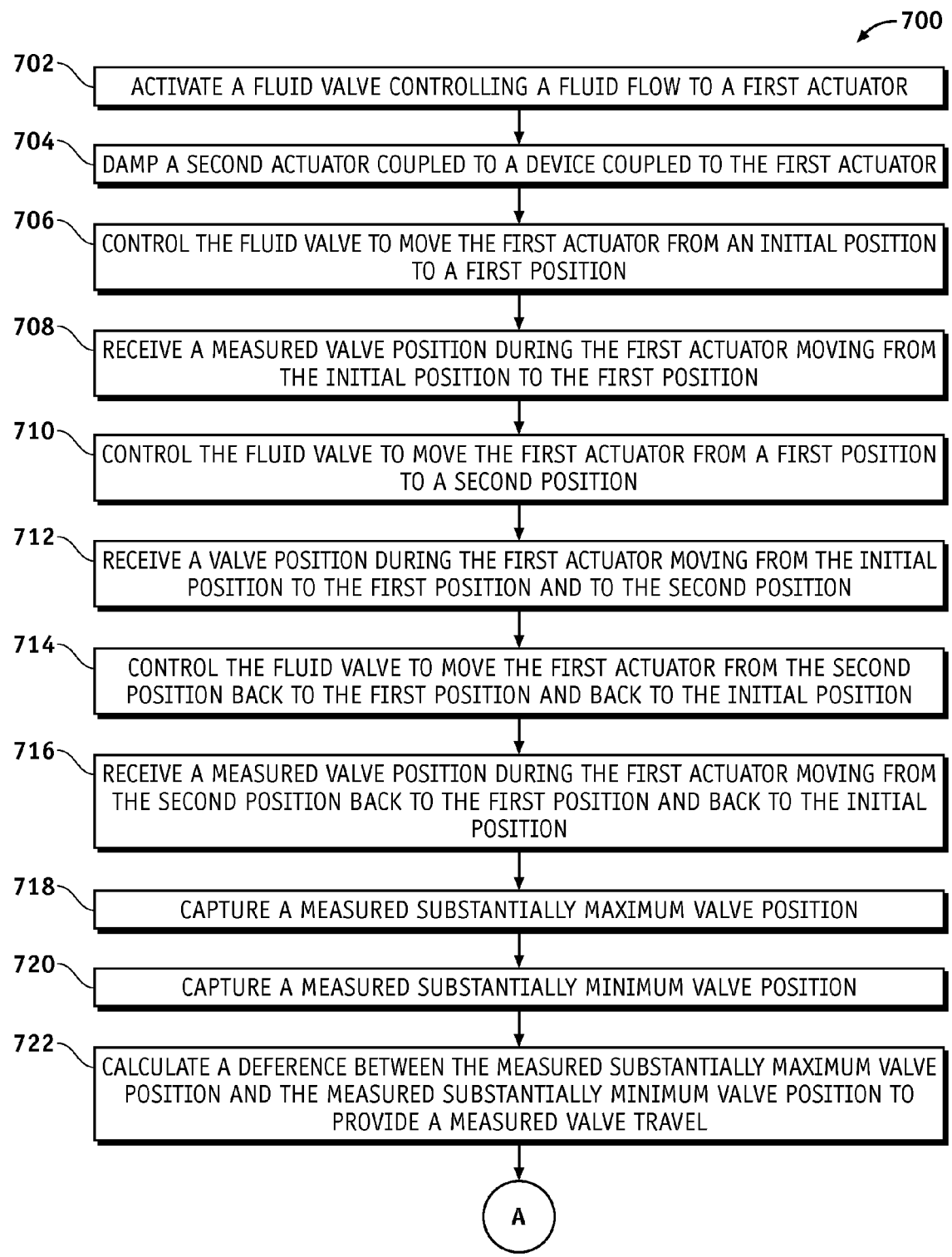
FIG. 7 is an illustration of an exemplary flowchart showing a non-optimal actuator detection process according to an embodiment of the disclosure.
Figure 7:
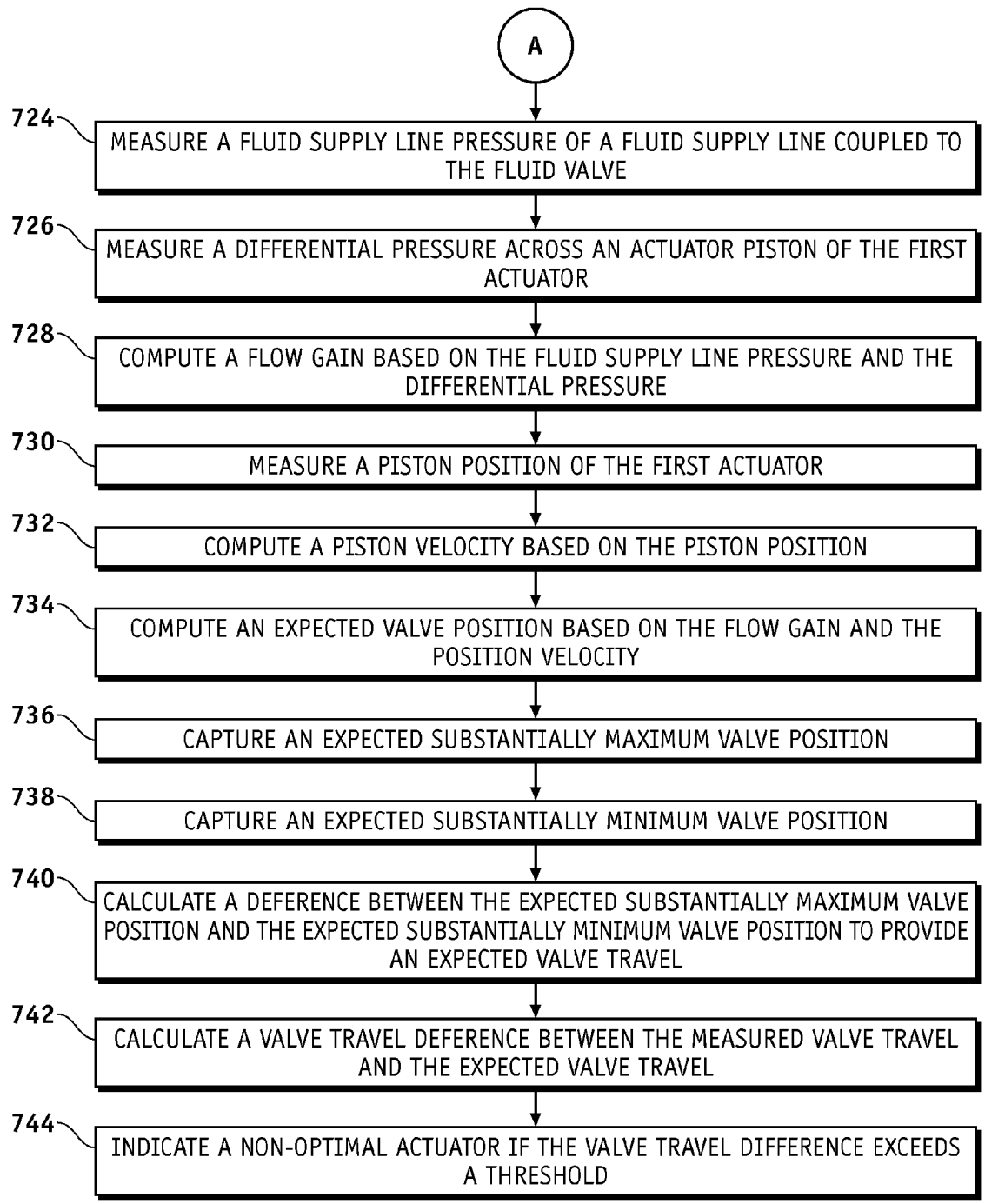

FIGS. 6-7 are illustrations of exemplary flowcharts showing non-optimal actuator detection processes 600-700 according to an embodiment of the disclosure. The various tasks performed in connection with processes 600-700 may be performed mechanically, by software, hardware, firmware, a computer-readable medium having computer executable instructions for performing the process method, or any combination thereof. It should be appreciated that processes 600-700 may include any number of additional or alternative tasks, the tasks shown in FIGS. 6-7 need not be performed in the illustrated order, and processes 600-700 may be incorporated into a more comprehensive procedure or process having additional functionality not described in detail herein.

For illustrative purposes, the following description of processes 600-700 may refer to elements mentioned above in connection with FIGS. 1-5. In practical embodiments, portions of the processes 600-700 may be performed by different elements of the system 300 such as: the control module 306, the sensing module 308, the evaluation module 310, the expected valve travel module 312, the processor module 314, the memory module 316, the measured valve travel module 318, etc. Processes 600-700 may have functions, material, and structures that are similar to the embodiments shown in FIGS. 1-5. Therefore common features, functions, and elements may not be redundantly described here.

Process 600 may begin by activating a fluid valve such as the fluid valve 304 controlling a fluid flow to a first actuator such as the actuator-under-test 302 (task 602).

Process 600 may continue by damping a second actuator such as the an adjacent actuator 512 coupled to a device coupled to the first actuator (task 604).

Process 600 may continue by controlling the fluid valve 304 to move the first actuator from the initial position 402 to a first position 404 and back to the initial position 402 during the test interval 490 (task 606).

Process 600 may continue by measuring the measured valve position 424 of the fluid valve 304 during the test interval 490 (task 608).

Process 600 may continue by calculating the measured valve travel 430 based on the measured valve position 424 at an end of the test interval 490 (task 610).

Process 600 may continue by calculating the expected valve travel 422 of the fluid valve 304 based on the fluid flow (task 612).

Process 600 may continue by determining a health status of the first actuator based on the measured valve travel 430 and the expected valve travel 422 (task 614).

Process 600 may continue by indicating a non-optimal actuator if a difference between the measured valve travel 430 and the expected valve travel 422 exceeds the threshold value 530 (task 616).

FIG. 7 is an illustration of the process 700 according to an embodiment of the disclosure.

Process 700 may begin by activating a fluid valve such as the fluid valve 304 controlling a fluid flow to a first actuator such as the actuator-under-test 302 (task 702).

Process 700 may continue by damping a second actuator such as the adjacent actuator 512 coupled to a device coupled to the actuator-under-test 302 (task 704).

Process 700 may continue by controlling the fluid valve 304 to move the actuator-under-test 302 from the initial position 402 to the first position 404 (task 706).

Process 700 may continue by receiving the measured valve position 424 during the first actuator moving from the initial position 402 to the first position 404 (task 708).

Process 700 may continue by controlling the fluid valve 304 to move the actuator-under-test 302 from the first position 404 to the second position 406 (task 710).

Process 700 may continue by receiving the measured valve position 424 during the actuator-under-test 302 moving from the initial position 402 to the first position 404 and to the second position 406 (task 712).

Process 700 may continue by controlling the fluid valve 304 to move the actuator-under-test 302 from the second position 406 back to the first position 404 and back to the initial position 402 (task 714).

Process 700 may continue by receiving the measured valve position 424 during the actuator-under-test 302 moving from the second position 406 back to the first position 404 and back to the initial position 402 (task 716).

Process 700 may continue by capturing the measured substantially maximum valve position 426 (task 718).

Process 700 may continue by capturing the measured substantially minimum valve position 428 (task 720).

Process 700 may continue by calculating a difference between the measured substantially maximum valve position 426 and the measured substantially minimum valve position 428 to provide the measured valve travel 430 (task 722).

Concurrently with the tasks 702-720 the process 700 may continue by calculating the expected valve travel by performing the following tasks 724-740.

Thus, the process 700 may continue by measuring the fluid supply line pressure 552 of a fluid supply line 484 coupled to the fluid valve 304 (task 724).

Process 700 may continue by measuring the differential pressure 536 across the actuator piston 502 of the actuator-under-test 302 (task 726).

Process 700 may continue by computing a flow gain 544 based on the fluid supply line pressure 552 and the differential pressure 536 (task 728).

Process 700 may continue by measuring the piston position 532 of the actuator-under-test 302 (task 730).

Process 700 may continue by computing the piston velocity 540 based on the piston position 532 (task 732).

Process 700 may continue by computing the expected valve travel 422 based on the expected valve position 416 (task 734).

Process 700 may continue by capturing the expected substantially maximum valve position 426 (task 736).

Process 700 may continue by capturing the expected substantially minimum valve position 420 (task 738).

Process 700 may continue by calculating a difference between the expected substantially maximum valve position and the expected substantially minimum valve position to provide the expected valve travel 422 (task 740).

Process 700 may continue by computing a valve travel difference between the measured valve travel and the expected valve travel (task 742).

Process 700 may continue by indicating a non-optimal actuator if the valve travel difference exceeds the threshold value 530 (task 744).

In this way, a system and methods provide an expedient, automated process transparent to the operators, and robust for testing a leakage of an actuator.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 314 to cause the processor module 314 to perform specified operations. Such instructions, generally referred to as "computer program code" or "program code" (which may be grouped in the form of computer programs or other groupings), when executed, enable power utilization scheduling methods of the system 300.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3 and 5 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A method for non-optimal actuator detection, the method comprising:
   activating a fluid valve controlling a fluid flow to a first actuator;
   controlling the fluid valve to move the first actuator from an initial position to a first position and back to the initial position during a test interval;
   measuring a measured valve position of the fluid valve during the test interval;
   calculating a measured valve travel based on the measured valve position at an end of the test interval; and
   determining a health status of the first actuator based on the measured valve travel and an expected valve travel.

2. The method of claim 1, further comprising damping a second actuator coupled to a device coupled to the first actuator.

3. The method of claim 1, further comprising calculating the expected valve travel of the fluid valve based on the fluid flow.

4. The method of claim 3, wherein the step of calculating the expected valve travel further comprises:
   measuring a fluid supply line pressure of a fluid supply line coupled to the fluid valve;
   measuring a differential pressure across an actuator piston of the first actuator;
   computing a flow gain based on the fluid supply line pressure and the differential pressure;
   measuring a piston position of the first actuator;
   computing a piston velocity based on one of a piston position command and the piston position;
   computing an expected valve position based on the flow gain and the piston velocity; and
   calculating the expected valve travel based on the expected valve position.

5. The method of claim 1, wherein the step of calculating the measured valve travel based on the measured valve position further comprises:
   receiving the measured valve position during the first actuator moving from the initial position to the first position and back to the initial position;
   capturing a measured substantially maximum valve position of the measured valve position;
   capturing a measured substantially minimum valve position of the measured valve position; and
   computing a difference between the measured substantially maximum valve position and the measured substantially minimum valve position to provide the measured valve travel.

6. The method of claim 5, wherein the measured substantially maximum valve position comprises at least one member selected from the group consisting of: a forward flow setting, and a reverse flow setting.

7. The method of claim 1, wherein the step of determining the health status further comprises:
   computing a valve travel difference between the measured valve travel and the expected valve travel; and
   indicating a non-optimal actuator if the valve travel difference exceeds a threshold.

8. The method of claim 1, further comprising controlling the fluid valve to move the first actuator from the initial position to the first position, to a second position, back to the first position, and back to the initial position during the test interval.

9. A non-optimal actuator detection system comprising:
   a control module operable to:
     activate a fluid valve controlling a fluid flow to a first actuator; and
     control the fluid valve to move the first actuator from an initial position to a first position and back to the initial position during a test interval;
   a sensing module operable to measure a measured valve position of the fluid valve during the test interval; and
   an evaluation module operable to:
     calculate a measured valve travel based on the measured valve position at an end of the test interval; and
     determine a health status of the first actuator based on the measured valve travel and an expected valve travel.

10. The system of claim 9, further comprising a second actuator coupled to a device coupled to the first actuator, wherein the second actuator operates in a damped mode.

11. The system of claim 10, wherein the device comprises a flight control surface coupled to an aircraft.

12. The system of claim 9, further comprising an expected valve travel module operable to compute the expected valve travel of the fluid valve based on the fluid flow.

13. The system of claim 12, wherein the expected valve travel module is further operable to:

receive a measured fluid supply line pressure of a fluid supply line coupled to the fluid valve;

receive a measured differential pressure across an actuator piston of the first actuator;

compute a flow gain based on the measured fluid supply line pressure and the measured differential pressure;

receive a measured piston position of the first actuator;

compute a piston velocity based on the measured piston position;

compute an expected valve position based on the flow gain and the piston velocity; and compute the expected valve travel based on the expected valve position.

14. The system of claim 9, further comprising a measured valve travel module operable to:

receive the measured valve position during the first actuator moving from the initial position to the first position and back to the initial position;

capture a measured substantially maximum valve position of the measured valve position;

capture a measured substantially minimum valve position of the measured valve position; and compute a difference between the measured substantially maximum valve position and the measured substantially minimum valve position to provide the measured valve travel.

15. The system of claim 14, wherein the measured substantially maximum valve position comprises at least one member selected from the group consisting of: a forward flow setting, and a reverse flow setting.

16. The system of claim 9, wherein the control module is further operable to control the fluid valve to move the first actuator from the initial position to the first position, to a second position, back to the first position, and back to the initial position during the test interval.

17. The system of claim 9, wherein the evaluation module is further operable to:

compute a valve travel difference between the measured valve travel and the expected valve travel; and indicate a non-optimal actuator if the valve travel difference exceeds a threshold.

18. A computer readable storage medium comprising computer-executable instructions for performing a method for actuator leakage detection, the method executed by the computer-executable instructions comprising:

activating a fluid valve controlling a fluid flow to a first actuator;

controlling the fluid valve to move the first actuator from an initial position to a first position and back to the initial position;

measuring a measured valve position of the fluid valve during a test interval;

calculating a measured valve travel based on the measured valve position; and determining a health status of the first actuator based on the measured valve travel and an expected valve travel.

19. The computer readable storage medium of claim 18, the method executed by the computer-executable instructions further comprising calculating the expected valve travel of the fluid valve based on the fluid flow.

20. The computer readable storage medium of claim 18, the method executed by the computer-executable instructions further comprising:

receiving the measured valve position during the first actuator moving from the initial position to the first position and back to the initial position;

capturing a measured substantially maximum valve position of the measured valve position;

capturing a measured substantially minimum valve position of the measured valve position; and computing a difference between the measured substantially maximum valve position and the measured substantially minimum valve position to provide the measured valve travel.

* * * * *